Figure 2:
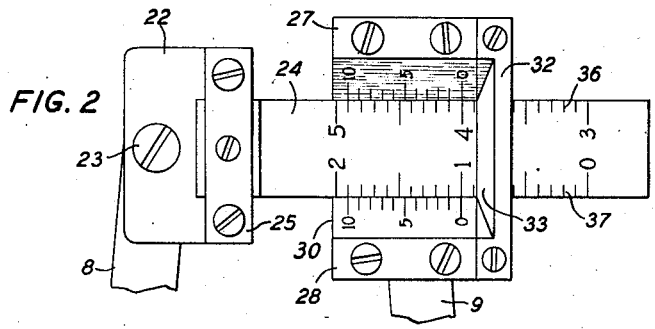

June 8, 1937.  J. M. HARDESTY ET AL  2,083,373

MEASURING TOOL

Filed Nov. 27, 1935

INVENTORS: J. M. HARDESTY
C. C. LAWSON

BY J. MacDonald

ATTORNEY

Patented June 8, 1937

2,083,373

UNITED STATES PATENT OFFICE 2,083,373

MEASURING TOOL

James M. Hardesty, East Orange, and Clement C. Lawson, Morristown, N. J., assignors to Bell Telephone Laboratories, Incorporated, New York, N. Y., a corporation of New York Application November 27, 1935, Serial No. 51,804

5 Claims. (Cl. 33—148)

This invention relates to a measuring tool and more particularly to a tool for measuring inside and outside diameters.

The object of the present invention is the provision of a tool which can be used both for inside and outside caliper measurements.

Another object of this invention is the provision of a measuring tool in which the results of some of the measurements are read directly on a scale which forms part of the tool.

A still further object of the invention is the provision of a tool which may be readily adjustable to any given size and the variations of the device measured readable directly on the caliper scale.

A still further object of the invention is the provision of a tool which utilizes a single indicating scale for both the inside and outside measurements. Heretofore, it has been common practice in the measuring of inside and outside distances to apply two separate sets of tools, namely an inside and an outside caliper. In applicants' tool they have incorporated in one single unit a means for indicating the inside and the outside measurements of any given article and the measurements being directly readable on a scale which forms part of the tool. With applicants' tool, it is unnecessary to compute the results inasmuch as the results are readily indicative thereon.

In applicants' tool they utilize a single scale for the inside and outside measurements thereby greatly simplifying the method heretofore used where it was desirable to obtain inside and outside measurements.

Applicants' tool was primarily developed for the measurement of the walls of vitrified clay conduits and also to measure the inside holes. However, applicants' device is not necessarily limited to these uses inasmuch as their tool may be used wherever it is necessary to measure the wall thickness and also the internal diameter. For example, pipes, tubes and various other articles which require an internal and an external measurement may be calipered by applicants' device.

While applicants' device, as shown, is a hand tool of fairly moderate size, there is no limit to the size of applicants' device and it can be readily made larger or smaller depending upon the work for which it has been designed.

Applicants' device comprises primarily a pair of arms which are pivoted together in such a manner that one set of the projecting arms may be extended or contracted by either exerting or reducing the pressure on the other end which may be termed the handle. Located on the shorter end of the tool are suitable projections which are arranged to contact the article to be measured. These extending portions project both inside and outside of the supporting arms, the outside projections being used to measure the interior dimension of an article and the interior projection being used to measure the wall thickness and the dimensions so obtained being readily readable on a scale which is secured at the side of the device. Applicants' device is also readily adjustable to various thicknesses so that any deviation in a desired thickness may be noted on the scale.

This invention has been illustrated in the accompanying drawing, in which

Figure 1:
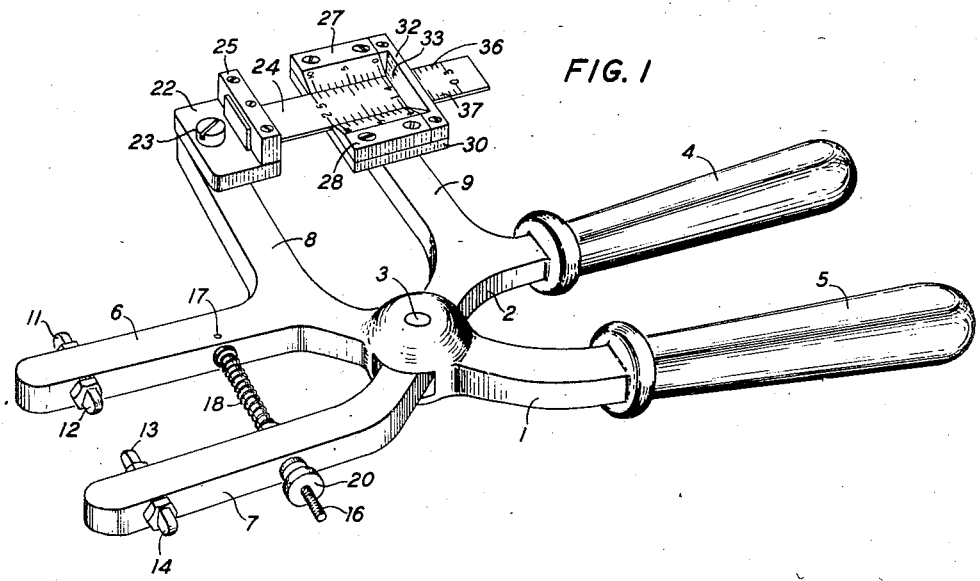

Fig. 1 shows in perspective a device embodying the features of this invention; and Fig. 2 shows an enlarged top view of the scales used for reading the measurements that may be taken by the device shown in Fig. 1.

Referring now to the drawing, the device consists of two members or arms 1 and 2 pivoted together at 3. These arms are provided at the right-hand side of the pivotal point 3 with handles 5 and 4, respectively, for manual operation of the device and at their opposite ends with jaws 6 and 7, respectively. The arm 1 is provided with an angularly projecting extension 8 and arm 2 is provided with a similar angularly projecting extension 9. The jaw 6 is provided with studs 11 and 12 screwed into the arm in opposite directions and projecting inwardly and outwardly at right angles to said arm. These studs are rounded at their extreme free ends. The jaw 7 is provided with similar studs 13 and 14 on opposite sides and projecting inwardly and outwardly at right angles to said jaw. These studs are also screwed into the jaw 7 and are rounded at their extreme free ends. The arms 1 and 2 may be held in any position in relationship to each other by means of a rod 16 pivoted at 17 into jaw 6 and projecting through a hole in arm 7. A spring 18 is mounted on rod 16 between the jaws 6 and 7, and on the outside of jaw 7 is a nut 20 which may be screwed onto rod 16 to space the jaws 6 and 7 so as to limit the separation of the arms 1 and 2 under pressure of spring 18. On the extension 8 is rotatably mounted block 22 by means of a screw 23. On this block is fixedly mounted a scale 24 by means of a clamp 25 secured by screws to the block 22. The free end of this scale 24 is slidably mounted between two vernier scales 27 and 28 which are secured to a block 30. This block 30 is pivotally mounted on extension 9 in any suitable manner. To hold the scale 24 slidably between the scales 27 and 28, a clamp 32 is provided having a beveled edge 33 to facilitate the easy reading of the scales. This clamp 32 is attached to block 30 by means of screws. The location of the pivotal points of blocks 22 and 30 in relation to the pivotal point of arms 1 and 2 are such that when the arms 1 and 2 are moved in relation to each other, the scale 24 will always occupy a tangential position in relation to a circle with the pivotal point of arms 1 and 2 as its center point.

This device may be used for taking measurements of inside, outside or wall thickness dimensions of, for example, such articles as conduits, pipes, tubes, etc. The inside dimension of a tube may be measured by holding the device in one hand by the handles 4 and 5 and extending the jaws 6 and 7 so that the free ends of studs 11 and 14 touch diametrically opposite points of the tube in line with the diameter of the tube. Then this measurement or diameter of the tube may be ascertained by reading the calibrations on the scale portion 36 of scale 24 and on the vernier scale 27 that correspond or coincide with each other. The device is so pictured in the drawing that the distance between the outside ends of the studs 11 and 14 will measure exactly four major units on the scale portion 36. This scale portion and the scale portion 37 on the opposite edge of the scale 24 may be calibrated in inches and each inch in ten equal parts, while the calibrations on the vernier scales 27 and 28 may comprise nine parts of an inch and divided in ten equal parts. Thus, the diameter of the tube may be read in inches and from one to one-hundred parts of an inch. It is evident that if the first calibration after the numeral 4 on scale 36 had coincided with the first calibration after the numeral 0 on the vernier scale 27, the measurement would have been four inches and one one-hundredth part of an inch, or if the calibration at the numeral 4 on scale 36 had coincided with the first calibration after the numeral 0 on the vernier scale 27, the measurement would have been three inches and nine-tenths of an inch. Similarly, if, for example, the wall thickness of a tube is to be measured the device is operated in the same manner by contracting the handles 4 and 5 until the free ends of the studs 12 and 13 contact with the inside and outside wall surfaces, respectively, of the tube on the line of a diameter of the tube. Then, this measurement or the thickness of the wall may be ascertained by reading the calibrations on the scale portion 37 and the vernier scale 28 that correspond or coincide with each other. The device is so pictured in the drawing that the distance between the outside free ends of studs 12 and 13 in this case will measure exactly one major unit on the scale portion 37. Thus, the thickness of the wall in this case measures exactly one inch. Corresponding portions of from one to one-hundred parts of an inch may be measured on scale 37 in cooperation with the vernier scale 28 in the same manner as on scales 36 and 27. The particular device shown is so designed that inside diametric measurements may be taken of from three to five inches and wall thicknesses may be taken up to two inches. Thus, this device may be used for any measurements within these limits and readings may be taken directly on the single scale 24 without any computations being necessary. It is evident that if the outside dimension of a tube or rod is measured, the reading should be taken on the scale portion 37 with the free ends of studs 12 and 13 contacting with diametrically opposite points on the outside surface of the article measured. If a certain measurement on a plurality of identical articles is to be tested, the device may be set to this measurement by the operation of the nut 20 and then the device applied to test this measurement on succeeding articles. It should be understood that devices of this type may be varied in size and proportions of the arms 6 and 7 and the projecting arms 8 and 9 and the position of the scale 24 on these arms may be changed so as to measure a plurality of other dimensions without departing from the spirit of the invention.

What is claimed is:

1. A tool for making inside and outside measurements comprising a pair of members pivoted together intermediate their ends, said members extending laterally on each side of said pivot to provide jaw portions and handle portions, a pair of nibs mounted on the inner and outer faces of said jaws, said nibs movable toward or away from each other by the operation of said handles, a pair of parallel arms extending from each of said pivoted members, a scale pivotally secured to one of said arms and a graduated guide for said scale secured to the other.

2. A tool for making inside and outside measurements comprising a pair of members pivoted together intermediate their ends, said members extending laterally on each side of said pivot to provide jaw portions and handle portions, a pair of nibs mounted on the inner and outer faces of said jaws, said nibs movable toward or away from each other by the operation of the handles, parallel arms extending from said pivoted members one from the jaw portion and the other from the handle portion, a scale pivotally connected to the arm on said jaw and a graduated guide for said scale secured to the arm on said handle.

3. A tool for making inside and outside measurements comprising a pair of members pivoted together intermediate their ends, said members extending laterally on each side of said pivot to provide jaw portions and handle portions, a pair of nibs mounted on the inner and outer faces of said jaws, said nibs movable toward or away from each other by the operation of said handles, parallel arms extending from said pivoted members one from the jaw portion and the other from the handle portion, a scale pivotally secured to the arm on said jaw, a graduated guide for said scale secured to the arm on said handle, and means on said jaw for limiting the amount of movement thereof.

4. A tool for making inside and outside measurements comprising a pair of members pivoted together intermediate their ends, said members extending laterally on each side of said pivot to provide jaw portions and handle portions, a pair of oppositely disposed nibs mounted on the inner face of said jaw and a pair of oppositely opposed nibs mounted on the outer face of said jaw, said nibs movable toward or away from each other by the operation of the handles, parallel arms extending from said pivoted members one from the jaw portion and the other from the handle portion, a scale pivotally connected to the arm on said jaw and a graduated guide for said scale secured to the arm on said handle.

5. A tool for making inside and outside measurements comprising a pair of members pivoted together intermediate their ends, said members extending laterally on each side of said pivot to provide jaw portions and handle portions, a pair of adjustable nibs mounted on the inner and outside faces of said jaws, said nibs movable toward or away from each other by the operation of the handles, parallel arms integral with and extending one from the jaw portion and one from the handle portion, a scale pivotally secured to the arm on said jaw, a graduated guide enclosing the free end of said scale, adjustable means on said jaws for limiting the outward movement thereof and compressible means cooperating with said limiting means for maintaining said jaws apart.

JAMES M. HARDESTY.
CLEMENT C. LAWSON.